J. A. FREESE.

Seed-Planter.

No. 35,814. Patented July 8, 1862.

Witnesses
J. W. Coombs
James Laird

Inventor
J. A. Freese
per Munn & Co.
Attys.

UNITED STATES PATENT OFFICE.

J. A. FREESE, OF HANOVER, OHIO.

IMPROVEMENT IN CORN-PLANTERS.

Specification forming part of Letters Patent No. 35,814, dated July 8, 1862.

*To all whom it may concern:*

Be it known that I, J. A. FREESE, of Hanover, in the county of Licking and State of Ohio, have invented a new and Improved Corn-Planter; and I do hereby declare that the following is a full, clear, and exact description of the same, reference being had to the accompanying drawings, making a part of this specification, in which—

Figure 1:
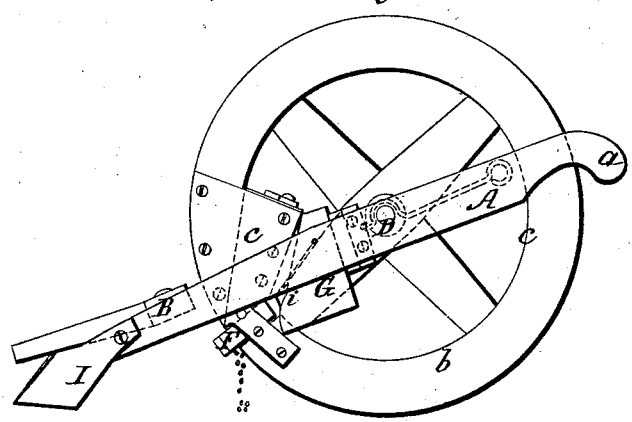
Figure 3:
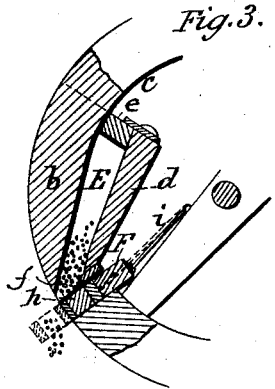
Figure 2:
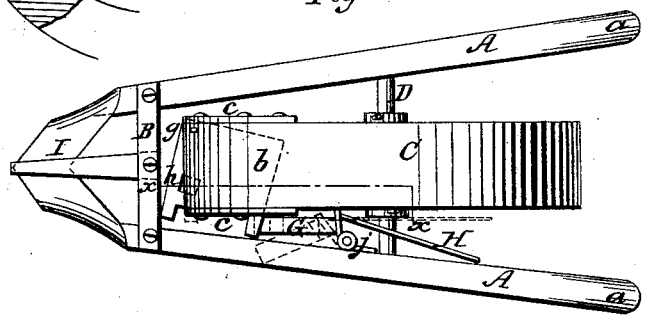

Figure 1 is a side view of my invention; Fig. 2, a plan or top view of the same; Fig. 3, a side sectional view of a portion of the same, taken in the line $x$ $x$, Fig. 3.

Similar letters of reference indicate corresponding parts in the several figures.

This invention relates to an improved corn-planter of that class designed for planting corn in hills, and which have their seed-dropping mechanism under the control of the operator, so that the seed may be planted in check-rows, or at equal distances apart in both directions, to admit of the rows of plants being properly tilled or cultivated by a plow or cultivator.

The invention consists in providing the seed cells or hoppers, which are placed in the rim or periphery of the wheel on which the machine is mounted, with a slide, and using in connection therewith an adjustable inclined plane attached to the frame of the machine, and so arranged that it may, at the will of the operator, be adjusted so as to actuate the seed-slide and cause the seed to drop from the hopper, or adjusted in such a position that the seed-slide will not be actuated by it.

To enable those skilled in the art to fully understand and construct my invention, I will proceed to describe it.

A A represent two bars, which have a slightly-oblique position relatively with each other, and which are connected near their front ends by a cross-bar, B. The back parts of the bars A A are rounded and bent to form handles $a$ $a$ for the operator or attendant to grasp.

C is a wheel the axle D of which is secured permanently in the bars A A, the wheel being placed loosely on it, and in the rim $b$ of this wheel, at its inner side, there is made a recess or chamber, E, which extends obliquely through the rim, and with the addition of two side plates, $c$ $c$, and a back plate, $d$, constitutes a seed cell or hopper, which is provided with a lid or cover, $e$. The discharge-orifice $f$ of the seed cell or hopper E is near the periphery of the rim $b$ of the wheel. In the rim $b$ and at the discharge-orifice $f$ of the seed cell or hopper E there is placed a slide, F, which works at one end on a pivot, $g$, and has a hole, $h$, made in it, which hole, when the slide is adjusted back within the rim, is in line with the discharge-orifice $f$ of the hopper E. The slide F has a spring, $i$, connected to it, which, when not acted upon by any extraneous force, keeps the slide in the position just mentioned.

To the inner side of one of the bars A there is attached by a hinge, $j$, an inclined plane, G, the inclined surface facing the front end of the machine, and the hinge or joint $j$ being attached to the back part of the block on which the inclined plane is formed. This inclined plane G has a rod, H, secured to it, which extends back over the axle D, and serves as a means to adjust the inclined plane G.

To the front end of the bars A A there is attached a plow, I, which forms a furrow to receive the seed.

The operation is as follows: The seed cell or hopper E is filled with seed, and as the machine is drawn along the wheel C rotates, and each time the end of the slide F comes in contact with the inclined plane G the former will be forced outward so that the opening or hole $h$ will pass out in front of the rim $b$ and the seed discharged in the furrow made by the plow I. When the end of the slide has passed the inclined plane G the spring $i$ will draw the slide back to its original position, so that the opening or hole $h$ will be in line with the discharge-orifice of the hopper E, and again be filled with seed for a second operation or dropping.

Although only one seed-cell or hopper is shown in the rim $b$ of the wheel C, two or more may be used, if required. The operator or attendant can render the seed-dropping mechanism inoperative at any time by shoving the inclined plane G back toward the bar A, to which it is connected, so as to be out of the plane of rotation of the end of the slide F. The rod H is grasped and moved to effect this result; and it will be seen that by means of this arrangement a very simple device is obtained to render the seed-dropping mechanism operative or inoperative, and to insure the planting of the corn in check-rows, or at equal distances apart, as a proper commencement of the dropping may be obtained in commencing each row.

I do not claim broadly the placing of the seed cells or hoppers in the rim or periphery of the wheel C; but I do claim as new and desire to secure by Letters Patent—

The seed cell or hopper E, one or more, placed in the rim of the wheel, and provided with the slide F, having the spring $i$ attached, in combination with the adjustable inclined plane G, attached to the frame of the machine, all arranged for joint operation as and for the purpose specified.

J. A. FREESE.

Witnesses:
 WM. D. EVANS,
 WM. WALRATH.